United States Patent
Mimeault et al.

(10) Patent No.: US 9,507,050 B2
(45) Date of Patent: Nov. 29, 2016

(54) ENTITY DETECTION SYSTEM AND METHOD FOR MONITORING AN AREA

(75) Inventors: Yvan Mimeault, Québec (CA); Martin Dubois, Charny (CA)

(73) Assignee: MONTEL INC., Montmagny, QC (CA)

( * ) Notice: Subject to any disclaimer, the term of this patent is extended or adjusted under 35 U.S.C. 154(b) by 15 days.

(21) Appl. No.: 13/505,543

(22) PCT Filed: Dec. 13, 2010

(86) PCT No.: PCT/IB2010/055785
§ 371 (c)(1),
(2), (4) Date: May 2, 2012

(87) PCT Pub. No.: WO2011/073888
PCT Pub. Date: Jun. 23, 2011

(65) Prior Publication Data
US 2012/0218107 A1    Aug. 30, 2012

Related U.S. Application Data

(60) Provisional application No. 61/286,175, filed on Dec. 14, 2009, provisional application No. 61/286,172, filed on Dec. 14, 2009.

(51) Int. Cl.
G08B 13/00    (2006.01)
G01V 8/20     (2006.01)

(52) U.S. Cl.
CPC .................... *G01V 8/20* (2013.01)

(58) Field of Classification Search
CPC .................................................... G01V 8/20
USPC ................ 340/555–557, 565, 540, 568.5; 250/222.1, 221
See application file for complete search history.

(56) References Cited

U.S. PATENT DOCUMENTS

| | | | |
|---|---|---|---|
| 4,988,189 A * | 1/1991 | Kroupa et al. | 356/4.03 |
| 5,044,703 A | 9/1991 | Dahnert | |
| 5,121,975 A | 6/1992 | Dahnert | |
| 5,160,190 A | 11/1992 | Farrell et al. | |
| 5,359,191 A * | 10/1994 | Griesemer et al. | 250/221 |
| 5,408,089 A | 4/1995 | Bruno et al. | |

(Continued)

FOREIGN PATENT DOCUMENTS

| | | |
|---|---|---|
| CA | 2370345 | 8/2002 |
| CA | 2568086 | 5/2008 |

(Continued)

*Primary Examiner* — Hai Phan
*Assistant Examiner* — Royit Yu
(74) *Attorney, Agent, or Firm* — Fraser Clemens Martin & Miller LLC; James D. Miller

(57) ABSTRACT

An entity detection method and system are provided for monitoring an area. The method comprises providing an illuminated band extending continuously along an extremity of the area; providing an optical detector having an image sensor adapted to capture an image, the illuminated band being viewable by the image sensor and being capturable in the image, a space between the band and the image sensor being part of the area; storing a detection threshold; analyzing the image to detect a discontinuity in the continuous illuminated band apparent on the image, comparing the detected discontinuity to the detection threshold; and indicating a status of the area to be one of a presence of an entity and an absence of the entity based on the comparing.

18 Claims, 13 Drawing Sheets

(56) References Cited

U.S. PATENT DOCUMENTS

| | | | |
|---|---|---|---|
| 5,417,487 A | 5/1995 | Dahnert | |
| 5,427,444 A | 6/1995 | Griesemer | |
| 5,569,910 A * | 10/1996 | Griesemer | 250/221 |
| 5,670,778 A | 9/1997 | Smith | |
| 5,850,082 A | 12/1998 | Eaton et al. | |
| 5,854,849 A | 12/1998 | Eaton | |
| 6,091,064 A * | 7/2000 | Eaton et al. | 250/221 |
| 6,233,005 B1 | 5/2001 | Cornillault et al. | |
| 6,384,407 B1 * | 5/2002 | Frank | 250/239 |
| 6,707,028 B2 * | 3/2004 | Housh et al. | 250/222.1 |
| 7,281,608 B2 | 10/2007 | Hansl et al. | |
| 7,484,631 B2 | 2/2009 | Bothun et al. | |
| 7,508,145 B2 | 3/2009 | Bourke et al. | |
| 7,521,665 B2 | 4/2009 | Reichinger et al. | |
| 7,554,652 B1 | 6/2009 | Babin et al. | |
| 7,583,037 B2 | 9/2009 | Bourke et al. | |
| 7,591,630 B2 | 9/2009 | Lert, Jr. | |
| 7,635,854 B1 | 12/2009 | Babin | |
| 7,640,122 B2 | 12/2009 | Levesque et al. | |
| 7,705,286 B2 * | 4/2010 | Tourdot et al. | 250/221 |
| 7,855,376 B2 | 12/2010 | Cantin et al. | |
| 7,868,759 B2 * | 1/2011 | Zimmerman | 340/568.5 |
| 7,895,007 B2 | 2/2011 | Levesque et al. | |
| 7,917,320 B2 | 3/2011 | Levesque et al. | |
| 8,159,660 B2 | 4/2012 | Mimeault et al. | |
| 2003/0184440 A1 * | 10/2003 | Ballantyne | 340/568.5 |
| 2004/0141633 A1 * | 7/2004 | Horie | 382/103 |
| 2005/0068535 A1 * | 3/2005 | Bond et al. | 356/433 |
| 2007/0228262 A1 * | 10/2007 | Cantin et al. | 250/221 |
| 2008/0044066 A1 * | 2/2008 | Miura et al. | 382/124 |
| 2008/0309914 A1 | 12/2008 | Cantin et al. | |
| 2009/0051255 A1 * | 2/2009 | Arbel | 312/201 |
| 2009/0059615 A1 | 3/2009 | Wainright | |
| 2009/0122405 A1 * | 5/2009 | Mimura | G02B 5/124 359/530 |
| 2009/0168419 A1 * | 7/2009 | Daimon | 362/235 |
| 2009/0201508 A1 * | 8/2009 | Schulz | G01D 5/28 356/448 |
| 2010/0191418 A1 | 7/2010 | Mimeault et al. | |
| 2010/0194595 A1 | 8/2010 | Mimeault et al. | |
| 2010/0277713 A1 | 11/2010 | Mimeault | |
| 2010/0309024 A1 | 12/2010 | Mimeault | |
| 2011/0050883 A1 * | 3/2011 | Ghose et al. | 348/113 |
| 2011/0205521 A1 | 8/2011 | Mimeault et al. | |

FOREIGN PATENT DOCUMENTS

| | | |
|---|---|---|
| EP | 1811427 | 7/2007 |
| JP | 4275423 | 10/1992 |
| JP | 20044245587 | 9/2004 |
| WO | 9726625 | 7/1997 |
| WO | 02103649 | 12/2002 |
| WO | 2009079779 | 7/2009 |
| WO | 2011077400 | 6/2011 |
| WO | 2012011037 | 1/2012 |

* cited by examiner

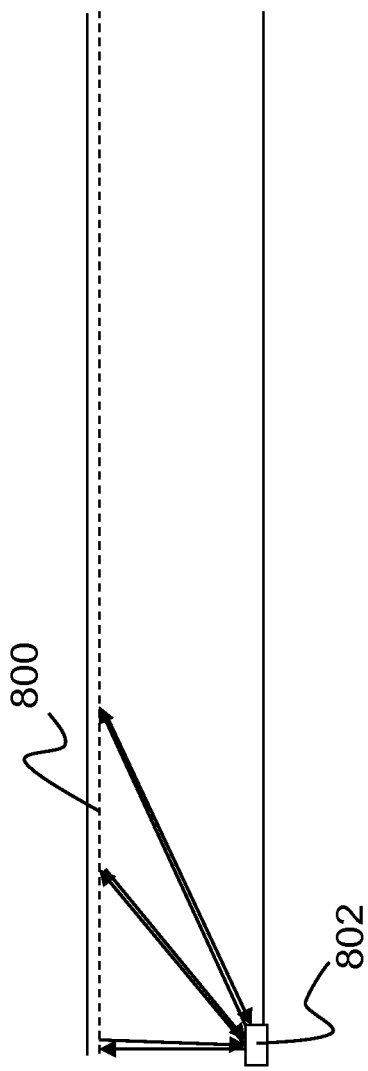
FIGURE 8A
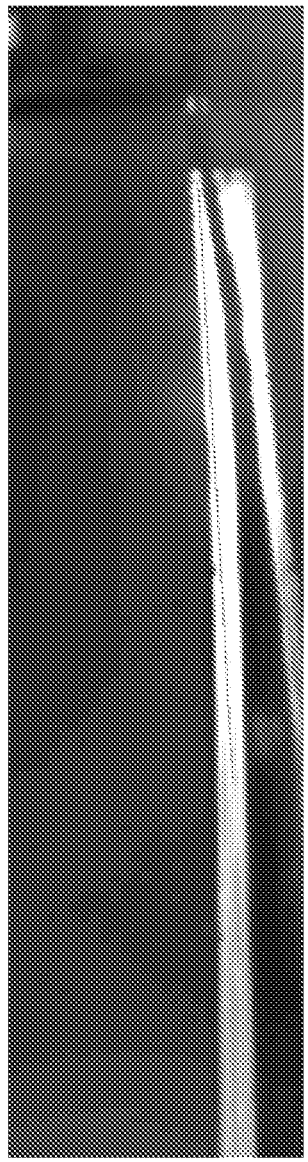
FIGURE 8B — Photograph

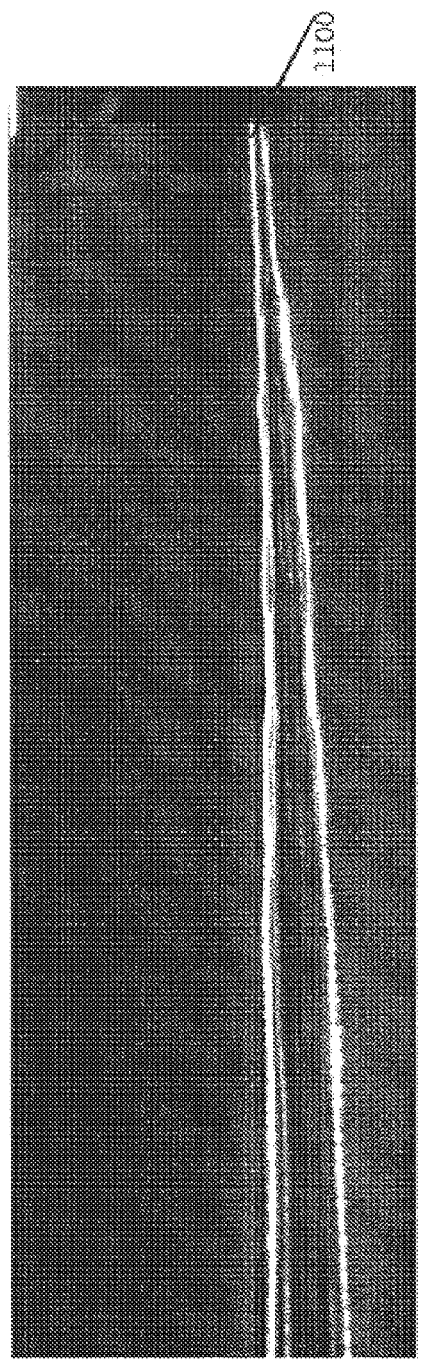
FIGURE 11A — PHOTOGRAPH
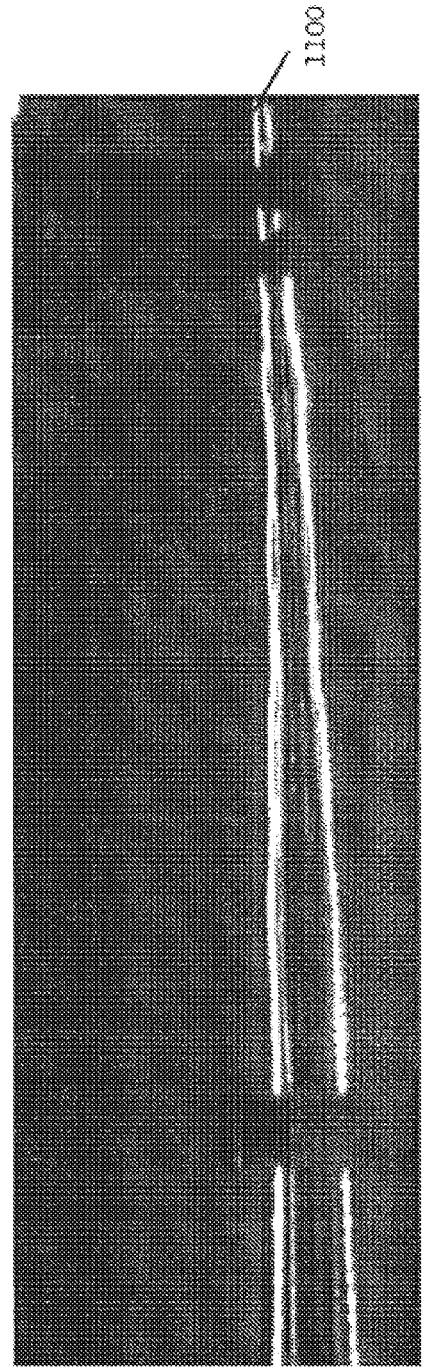
FIGURE 11B — PHOTOGRAPH

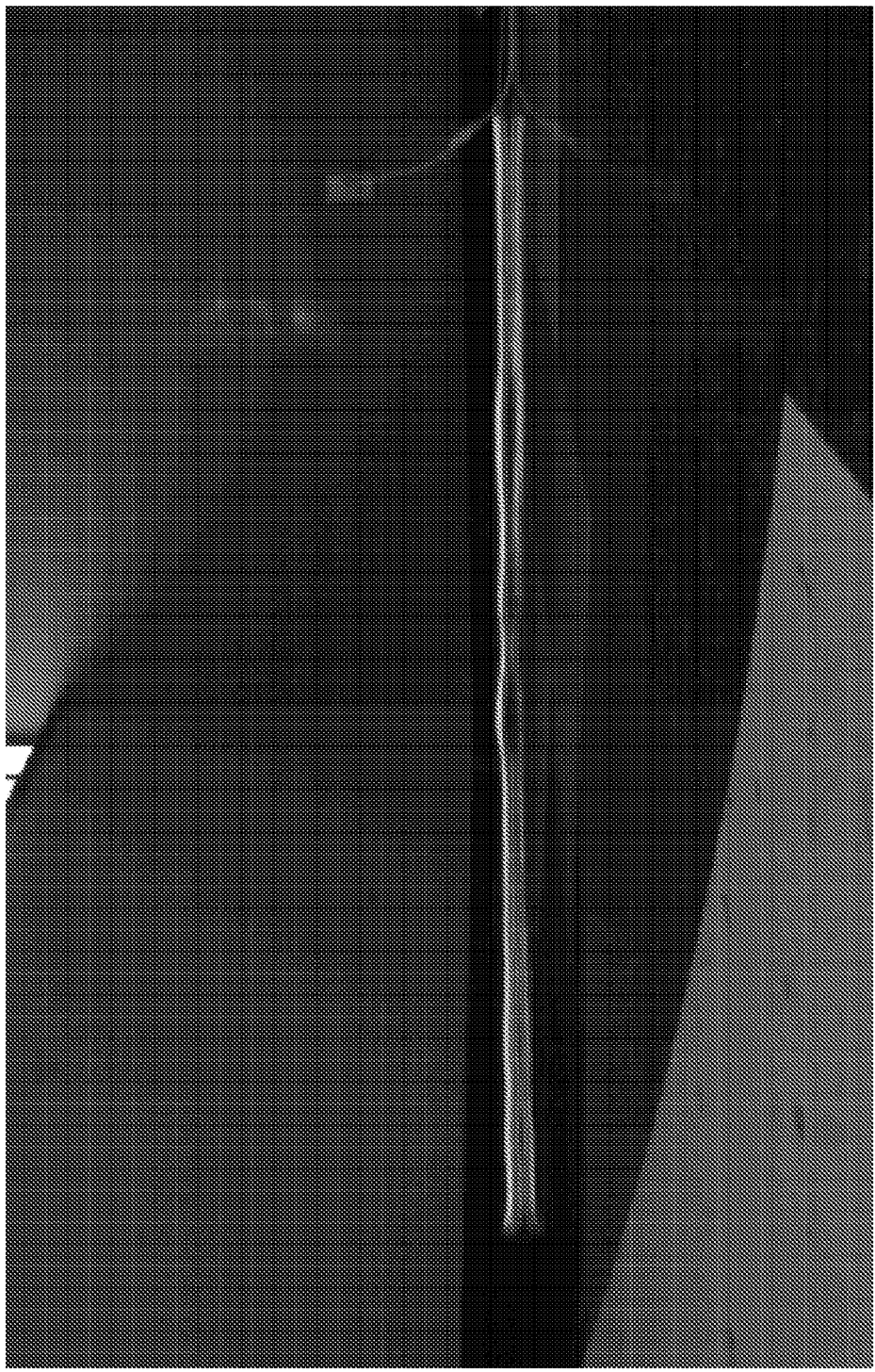
FIGURE 12 — PHOTOGRAPH

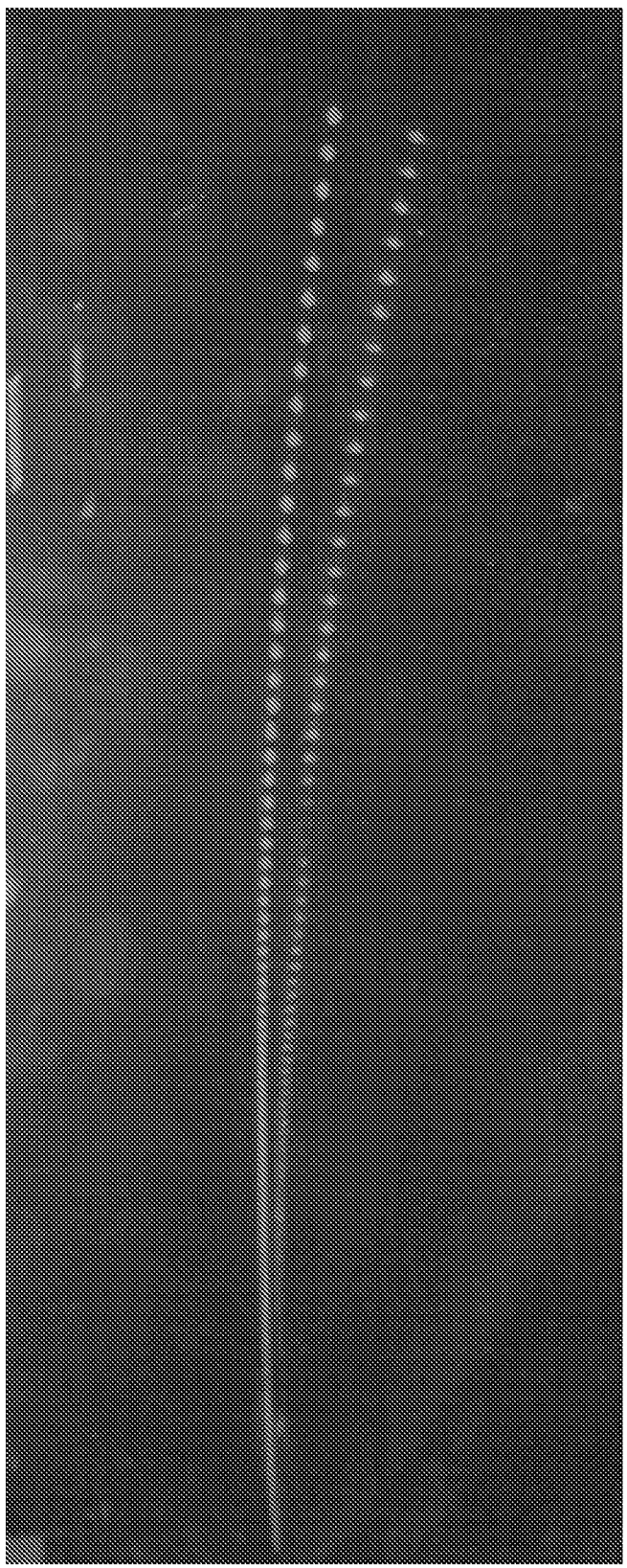
FIGURE 13 — PHOTOGRAPH

ENTITY DETECTION SYSTEM AND METHOD FOR MONITORING AN AREA

CROSS-REFERENCE TO RELATED APPLICATIONS

This application is a national phase entry of PCT Application No. PCT/IB2010/055785, entitled "ENTITY DETECTED SYSTEM AND METHOD FOR MONITORING AN AREA", filed on Dec. 13, 2010; which in turn claims priority of US provisional patent application Ser. No. 61/286,175 filed on Dec. 14, 2009, and of US provisional patent application Ser. No. 61/286,172 filed on Dec. 14, 2009, the specifications of which are hereby incorporated by reference.

TECHNICAL FIELD

The present invention generally relates to entity detection systems and more particularly to an entity detection system for detecting the presence of an entity in a monitored area delimited by the illumination of a lighting system.

BACKGROUND OF THE ART

Detecting the presence of an entity in a specific area is a need which arises in many different situations. Applications which make use of such a detection include intrusion in a security perimeter or detection of an entity in an area having systems, or actuators, that can be dangerous for this entity.

Several detection systems have been developed and installed for sensing an entity in a specific area or for detecting an entity in a area that includes some risk for that entity. Some systems use motion sensors and assess changes in ambient temperature produced by a moving entity. They are therefore not designed to detect a moving entity since its temperature is typically the same as the ambient temperature. Also, motion sensors are not capable of detecting a stationary entity. Another alternative is to use an infrared source and an infrared receiver to detect the presence of an entity. Detection occurs when an entity interferes with the reception by the receiver of the emitted infrared signal. Even if several sources and receivers are installed to cover the surface of the monitored area, gaps always exist, leaving areas not covered by the entity detection system. Thus, there is a need for improvements in the detection of entities in monitored areas.

An example of where this need is felt is in the area of mobile storage systems. The optimization of space for storing different kinds of material is the main benefit of mobile storage systems. However, using a mobile storage system implies security issues. When the need to open an aisle explicitly requires to close another aisle, it is very important to detect the presence of an entity in the aisle before closing it. Thus, there is a need for improvements in the detection of moving and stationary entities in mobile storage systems.

SUMMARY

A proposed solution includes using lighting as a component of the entity detection system which can be used to provide illumination for the user, send a feedback for the detection and delimit the area.

Examples of applications where such a solution could be used include mobile storage units, elevators, aisles, fences and walls delimiting monitored areas, no-trespassing areas, for example in industrial settings, light curtains applications, etc.

One aspect of the invention provides an entity detection method for monitoring an area. The method comprises providing an illuminated band extending continuously along an extremity of the area; providing an optical detector having an image sensor adapted to capture an image, the illuminated band being viewable by the image sensor and being capturable in the image, a space between the band and the image sensor being part of the area; storing a detection threshold; analyzing the image to detect a discontinuity in the continuous illuminated band apparent on the image, comparing the detected discontinuity to the detection threshold; and indicating a status of the area to be one of a presence of an entity and an absence of the entity based on the comparing.

In one embodiment, the illuminated band is a continuous distributed light source.

In one embodiment, the continuous distributed light source is a strip of Light-Emitting-Diodes.

In one embodiment, the strip of Light-Emitting-Diodes comprises a diffuser.

In one embodiment, the continuous distributed light source is a light pipe with optic fiber.

In one embodiment, the continuous illuminated band is a retro-reflective band, wherein the optical detector further comprises a punctual light source emitting light toward the retro-reflective band.

One aspect of the invention provides an entity detection system for monitoring an area. The system comprises an illuminated band extending continuously along an extremity of the area; an optical detector having an image sensor adapted to capture an image, the illuminated band being viewable by the image sensor and being capturable in the image, a space between the band and the image sensor being part of the area; a memory for storing a detection threshold; and a processor receiving the image from the image sensor, having an image analyzer for analyzing the image to detect a discontinuity in the continuous illuminated band apparent on the image, a discontinuity comparator for comparing the detected discontinuity to the detection threshold; and a status indicator for indicating a status of the area to be one of a presence of an entity and an absence of the entity based on the comparing.

One aspect of the invention provides a mobile storage having a mobile storage unit extending along a longitudinal axis, with a detection side; an opposing unit extending substantially parallel to the longitudinal axis, having a detection side facing the detection side of the mobile storage unit; at least one detection duo having: an illuminated band extending continuously along the longitudinal axis of a first one of the detection side of the mobile storage unit and the detection side of the opposing unit; an optical detector provided at a second one of the detection side of the mobile storage unit and the detection side of the opposing unit, the second one being different from the first one; the illuminated band being viewable by the optical detector; the mobile storage unit being movable between a closed position wherein the detection sides of the mobile storage unit and the opposing unit are juxtaposed and an open position wherein the mobile storage unit and the opposing unit are spaced-apart and a longitudinally extending aisle is defined therebetween.

In one embodiment, the mobile storage further comprises a an optical detector having a memory for storing a detection threshold; a processor having an image analyzer for analyzing the image to detect a discontinuity in the continuous illuminated band apparent on the image, determining a discontinuity length of the discontinuity, comparing the discontinuity length to the detection threshold; and indicating a status of the aisle to be presence of an obstacle if the discontinuity length is longer than the detection threshold and indicating the status of the portion of the aisle to be absence of an obstacle if the discontinuity length is shorter than the detection threshold.

In one embodiment, there are two detection duos, the detection side of the mobile storage unit and the detection side of the opposing unit each having the illuminated band extending continuously along the longitudinal axis, the detection side of the mobile storage unit and the detection side of the opposing unit each having the optical detector.

Still another aspect of the detection system for a mobile storage system provides at least a first mobile storage unit having at least two opposed sides; an opposing object selected from the group consisting of a wall, a second mobile storage unit and a stationary storage unit, a detection side of the opposing object facing the first mobile storage unit on one aisle side of the at least two opposed sides, an aisle being defined between the first mobile storage unit and the opposing object, the aisle having a first aisle end and a second aisle end; the detection system comprising : for the aisle side of the at least two opposed sides of the first mobile storage unit, a first continuous illuminated band provided along the length of the aisle side; a first optical detector provided at the first aisle end of the first band facing the detection side and able to acquire and transmit a first image; for the detection side, a second continuous illuminated band provided along the length of the detection side, viewable by the first optical detector, wherein a full length of the second continuous illuminated band is apparent on the first image when no obstacle is present in the aisle and the aisle is in an open position; a second optical detector provided at the second aisle end of the second band facing the aisle side and able to acquire and transmit a second image, wherein a full length of the first continuous illuminated band is apparent on the second image when no obstacle is present in the aisle and the aisle is in an open position; a control unit having a receiver for receiving the first image and the second image from the first optical detector and the second optical detector; a memory for storing a detection threshold; a processor having a first image analyzer for analyzing the first image to detect a first discontinuity in the second continuous illuminated band apparent on the first image, determining a first discontinuity length of the first discontinuity, comparing the first discontinuity length to the detection threshold; and indicating a status of a first portion of the aisle to be presence of an obstacle if the first discontinuity length is longer than the detection threshold and indicating the status of the first portion of the aisle to be absence of an obstacle if the first discontinuity length is shorter than the detection threshold, a second image analyzer for analyzing the second image to detect a second discontinuity in the first continuous illuminated band apparent on the second image, determining a second discontinuity length of the second discontinuity, comparing the second discontinuity length to the detection threshold; and indicating a status of a second portion of the aisle to be presence of an obstacle if the second discontinuity length is longer than the detection threshold and indicating the status of the second portion of the aisle to be absence of an obstacle if the second discontinuity length is shorter than the detection threshold, a status determiner for determining a status of the aisle to be occupied if at least one of the status of the first portion and the status of the second portion is the presence of an obstacle and for determining a status of the aisle to be empty if both of the status of the first portion and the status of the second portion is the absence of an obstacle.

Still another aspect of the invention provides a detection method for a mobile storage system having at least a first mobile storage unit having at least two opposed sides; an opposing object selected from the group consisting of a wall, a second mobile storage unit and a stationary storage unit, a detection side of the opposing object facing the first mobile storage unit on one aisle side of the at least two opposed sides, an aisle being defined between the first mobile storage unit and the opposing object, the aisle having a first aisle end and a second aisle end; for the aisle side of the at least two opposed sides of the first mobile storage unit, a first continuous illuminated band provided along the length of the aisle side; a first optical detector provided at the first aisle end of the first band facing the detection side and able to acquire and transmit a first image; for the detection side, a second continuous illuminated band provided along the length of the detection side, viewable by the first optical detector, wherein a full length of the second continuous illuminated band is apparent on the first image when no obstacle is present in the aisle and the aisle is in an open position; a second optical detector provided at the second aisle end of the second band facing the aisle side and able to acquire and transmit a second image, wherein a full length of the first continuous illuminated band is apparent on the second image when no obstacle is present in the aisle and the aisle is in an open position; the detection method comprising : receiving the first image and the second image from the first optical detector and the second optical detector; storing a detection threshold and the first image and the second image; analyzing the first image to detect a first discontinuity in the second continuous illuminated band apparent on the first image, determining a first discontinuity length of the first discontinuity, comparing the first discontinuity length to the detection threshold; and indicating a status of a first portion of the aisle to be presence of an obstacle if the first discontinuity length is longer than the detection threshold and indicating the status of the first portion of the aisle to be absence of an obstacle if the first discontinuity length is shorter than the detection threshold, analyzing the second image to detect a second discontinuity in the first continuous illuminated band apparent on the second image, determining a second discontinuity length of the second discontinuity, comparing the second discontinuity length to the detection threshold; and indicating a status of a second portion of the aisle to be presence of an obstacle if the second discontinuity length is longer than the detection threshold and indicating the status of the second portion of the aisle to be absence of an obstacle if the second discontinuity length is shorter than the detection threshold, determining a status of the aisle to be occupied if at least one of the status of the first portion and the status of the second portion is the presence of an obstacle and for determining a status of the aisle to be empty if both of the status of the first portion and the status of the second portion is the absence of an obstacle.

In one embodiment, the method further comprises storing an intensity threshold, analyzing the first image and the second image to detect an intensity for each the first and second discontinuity, comparing each the intensity to the intensity threshold, indicating the status to be the presence of the obstacle if the intensity is lower than the intensity threshold and indicating the status to be the absence of the obstacle if the intensity is higher than the intensity threshold.

Still another aspect of the present invention provides a mobile storage having a mobile storage unit extending along a longitudinal axis, having a detection side with an illuminated band extending continuously along the longitudinal axis, and an optical detector; an opposing unit extending substantially parallel to the longitudinal axis, having a detection side facing the detection side of the mobile storage unit, having an illuminated band extending continuously along the longitudinal axis and viewable by the optical detector of the mobile storage unit, and having an optical detector spaced-apart from the optical detector of the mobile storage unit along the longitudinal axis, the illuminated band of the mobile storage unit being viewable by the optical detector of the opposing unit, the mobile storage unit being movable between a closed position wherein the detection sides of the mobile storage unit and the opposing unit are juxtaposed and an open position wherein the mobile storage unit and the opposing unit are spaced-apart and a longitudinally extending aisle is defined therebetween.

In one embodiment, the illuminated bands of the mobile storage unit and the opposing unit extend from a first end to an opposed second end of the longitudinally extending aisle.

In one embodiment, the optical detector of the opposing unit is located at the first end and the optical detector of the mobile storage unit is located at the second end.

In one embodiment, the illuminated band of the opposing unit is entirely viewable by the optical detector of the mobile storage unit and the illuminated band of the mobile storage unit is entirely viewable by the optical detector of the opposing unit.

In one embodiment, the system further comprises a control unit having a receiver for receiving a mobile unit image from the optical detector of the mobile storage unit and a opposing unit image from the optical detector of the opposing unit; a memory for storing a detection threshold; a processor having a mobile unit image analyzer for analyzing the mobile unit image to detect a first discontinuity in the continuous illuminated band of the opposing unit apparent on the mobile unit image, determining a first discontinuity length of the first discontinuity, comparing the first discontinuity length to the detection threshold; and indicating a status of a first portion of the aisle to be presence of an obstacle if the first discontinuity length is longer than the detection threshold and indicating the status of the first portion of the aisle to be absence of an obstacle if the first discontinuity length is shorter than the detection threshold, an opposing unit image analyzer for analyzing the opposing unit image to detect a second discontinuity in the continuous illuminated band of the mobile unit apparent on the opposing unit image, determining a second discontinuity length of the second discontinuity, comparing the second discontinuity length to the detection threshold; and indicating a status of a second portion of the aisle to be presence of an obstacle if the second discontinuity length is longer than the detection threshold and indicating the status of the second portion of the aisle to be absence of an obstacle if the second discontinuity length is shorter than the detection threshold, a status determiner for determining a status of the aisle to be occupied if at least one of the status of the first portion and the status of the second portion is the presence of an obstacle and for determining a status of the aisle to be empty if both of the status of the first portion and the status of the second portion is the absence of an obstacle.

Another aspect of the invention provides a mobile storage having a mobile storage unit extending along a longitudinal axis, having a detection side with an illuminated band extending continuously along the longitudinal axis; an opposing unit extending substantially parallel to the longitudinal axis, having a detection side facing the detection side of the mobile storage unit, having an optical detector, the illuminated band of the mobile storage unit being viewable by the optical detector of the opposing unit, the mobile storage unit being movable between a closed position wherein the detection sides of the mobile storage unit and the opposing unit are juxtaposed and an open position wherein the mobile storage unit and the opposing unit are spaced-apart and a longitudinally extending aisle is defined therebetween.

In one embodiment, the mobile storage further comprises a control unit having a receiver for receiving a opposing unit image from the optical detector of the opposing unit; a memory for storing a detection threshold; a processor having an opposing unit image analyzer for analyzing the opposing unit image to detect a second discontinuity in the continuous illuminated band of the mobile unit apparent on the opposing unit image, determining a second discontinuity length of the second discontinuity, comparing the second discontinuity length to the detection threshold; and indicating a status of a second portion of the aisle to be presence of an obstacle if the second discontinuity length is longer than the detection threshold and indicating the status of the second portion of the aisle to be absence of an obstacle if the second discontinuity length is shorter than the detection threshold.

Another aspect of the invention provides a mobile storage having a mobile storage unit extending along a longitudinal axis, having a detection side with an optical detector; an opposing unit extending substantially parallel to the longitudinal axis, having a detection side facing the detection side of the mobile storage unit, having an illuminated band extending continuously along the longitudinal axis and viewable by the optical detector of the mobile storage unit, the mobile storage unit being movable between a closed position wherein the detection sides of the mobile storage unit and the opposing unit are juxtaposed and an open position wherein the mobile storage unit and the opposing unit are spaced-apart and a longitudinally extending aisle is defined therebetween.

In one embodiment, the mobile storage further comprises a control unit having a receiver for receiving a mobile unit image from the optical detector of the mobile storage unit; a memory for storing a detection threshold; a processor having a mobile unit image analyzer for analyzing the mobile unit image to detect a first discontinuity in the continuous illuminated band of the opposing unit apparent on the mobile unit image, determining a first discontinuity length of the first discontinuity, comparing the first discontinuity length to the detection threshold; and indicating a status of a first portion of the aisle to be presence of an obstacle if the first discontinuity length is longer than the detection threshold and indicating the status of the first portion of the aisle to be absence of an obstacle if the first discontinuity length is shorter than the detection threshold.

Another aspect of the invention provides a detection system for a mobile storage system having at least one mobile storage unit having at least two opposed sides; an opposing object selected from the group consisting of a wall, a second mobile storage unit and a stationary storage unit, a detection side of the opposing object facing the mobile storage unit on one aisle side of the at least two opposed sides, an aisle being defined between the first mobile storage unit and the opposing object, the aisle having a first aisle end and a second aisle end; the detection system comprising : for the aisle side of the at least two opposed sides of the first mobile storage unit, a continuous illuminated band provided along the length of the aisle side; for the detection side, an optical detector facing the aisle side and able to acquire and transmit an image, wherein a full length of the first continuous illuminated band is apparent on the image when no obstacle is present in the aisle and the aisle is in an open position; a control unit having a receiver for receiving the image from the optical detector; a memory for storing a detection threshold; a processor having an image analyzer for analyzing the image to detect a discontinuity in the continuous illuminated band apparent on the image, determining a discontinuity length of the discontinuity, comparing the discontinuity length to the detection threshold; and indicating a status of the aisle to be presence of an obstacle if the discontinuity length is longer than the detection threshold and indicating the status of the portion of the aisle to be absence of an obstacle if the discontinuity length is shorter than the detection threshold.

Another aspect of the invention provides a detection system for a mobile storage system having at least one mobile storage unit having at least two opposed sides; an opposing object selected from the group consisting of a wall, a second mobile storage unit and a stationary storage unit, a detection side of the opposing object facing the mobile storage unit on one aisle side of the at least two opposed sides, an aisle being defined between the mobile storage unit and the opposing object; the detection system comprising : for the aisle side of the at least two opposed sides of the mobile storage unit, an optical detector facing the detection side and able to acquire and transmit a image; for the detection side, a continuous illuminated band provided along the length of the detection side, viewable by the optical detector, wherein a full length of the continuous illuminated band is apparent on the image when no obstacle is present in the aisle and the aisle is in an open position; a control unit having a receiver for receiving the image from the optical detector; a memory for storing a detection threshold; a processor having an image analyzer for analyzing the image to detect a discontinuity in the continuous illuminated band apparent on the image, determining a discontinuity length of the discontinuity, comparing the discontinuity length to the detection threshold; and indicating a status of the aisle to be presence of an obstacle if the discontinuity length is longer than the detection threshold and indicating the status of the portion of the aisle to be absence of an obstacle if the discontinuity length is shorter than the detection threshold.

Throughout this specification, the term "non-visible" is intended to be a synonym of the terms "invisible" and "nonvisible" and to be an antonym to the word "visible". It should be understood that "visible light" refers to light emitted at wavelengths which are visible to the human eye. Similarly, "invisible light" refers to light emitted at wavelengths which are not visible to the human eye.

Throughout this specification, the term "area" is intended to mean a volume of space, such as an horizontal volume of space near the floor of a room, a vertical volume of space delimited by a door framing (such as the volume of space created when an elevator door is open), a volume of space of an aisle created between two units of a mobile storage unit system, etc.

Throughout this specification, the term "entity" is intended to include any moving or stationary entity, having a detectable presence in an area, such as a person, an animal, an object, an environmental particle, a gas, a liquid, a particle such as dust, etc. If the area to be monitored is to be protected against the presence of a person or animal, this person or animal can be referred to as an "intruder". If the area to be monitored is to be kept free of any object, person or animal, the object, person or animal present in the area can be referred to as an "obstacle". Intruders and obstacles are entities.

Throughout this specification, the term "environmental particle" is intended to include any particle detectable in the air or on the ground and which is typically caused by an environmental, chemical or natural phenomenon. It includes fog, rain, snow, smoke, gas, smog, hail, etc.

BRIEF DESCRIPTION OF THE DRAWINGS

Having thus generally described the nature of the invention, reference will now be made to the accompanying drawings, showing by way of illustration a preferred embodiment thereof and in which:

FIG. 8 comprises FIG. 8A and FIG. 8B (photograph) which shows an example embodiment using a retroreflector and a photograph of the captured image of the retroreflective band;

FIG. 11 comprises FIGS. 11A (photograph) and 11B (photograph) which show photographs of example images captured by the optical detectors, in FIG. 11A, there is no entity present, in FIG. 11B, three entities are present;

FIG. 12 (photograph) is a photograph of an example image where the whole illuminated band is apparent and the non-illuminated sides of the band are also apparent; and FIG. 13 (photograph) is a photograph of an example image where the illuminated band is created by a series of punctual sources, namely a strip of LEDs.

It will be noted that throughout the appended drawings, like features are identified by like reference numerals.

DETAILED DESCRIPTION

Figure 1:
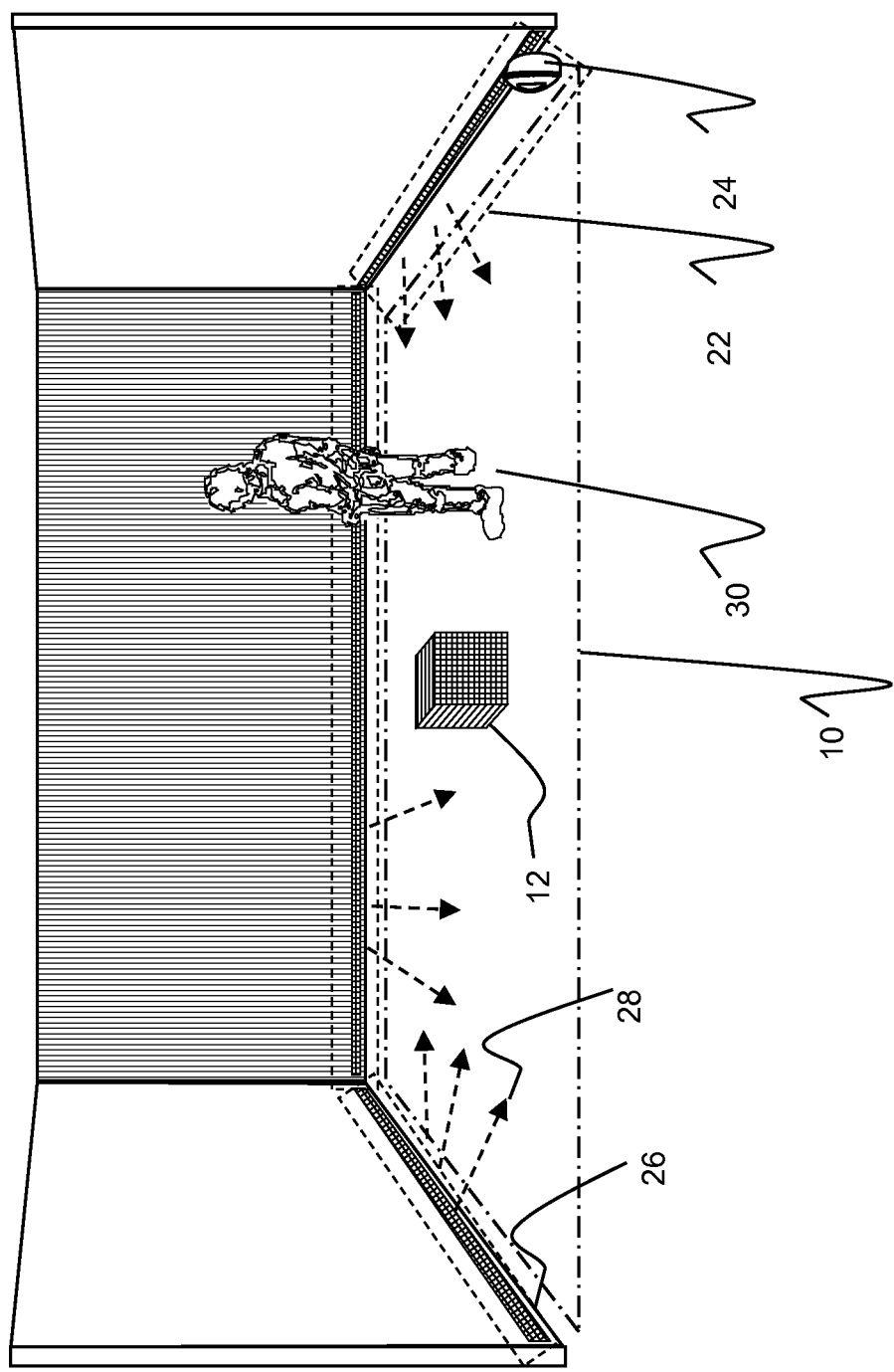
FIG. 1 shows an example embodiment of the entity detection system in a monitored area.

FIG. 1 shows a monitored area 10, with a permanent feature 12 of the area which is monitored by an entity detection system 22 for detecting a moving entity within the monitored area. As will be readily understood, the permanent feature 12 of the area is present in the example monitored area 10 of FIG. 1 to ensure a complete description of the example embodiment. In another example, such a permanent feature 12 of the area may take on different shapes and sizes, may include many permanent features 12 or need not be present. Other entities present in the monitored area, which are not permanent features of the area will be referred to as entities 30.

The entity detection system 22 has at least one optical detector 24 and at least one distributed light source 26 illuminating and delimiting the monitored area 10 with visible or invisible light 28. The optical detector 24 detects the illumination of the distributed light source 26.

The optical detector 24 and the distributed light source 26 are typically installed on a side of the physical structure of the monitored area, close to or on the floor. As will be readily understood, other configurations are possible. For example, the illuminated band may be provided near the ground and the optical detector may be provided at a level higher than that of the band. It can be hung from the ceiling, for example. The distributed light source 26 emits visible light (red, green, white, etc) or invisible light (infrared for instance). Typically, the distributed light source 26 is made of a strip of LEDs, a light pipe with optic fiber or other light source able to distribute the illumination on the monitored area. The distributed light source covers sections of the monitored area. To improve the diffusion of illumination, a diffuser (not shown) can be placed in front of the distributed light source 26. The diffuser is particularly useful when the distributed light source 26 is made by using LEDs or other punctual sources. Several types of diffusers or lenses can be used to improve the illumination function of the system. However, for detection purposes, the illumination may be provided by a series of punctual sources spaced apart by a small distance, for example a few centimeters, or a whole light source band along the side of the monitored area to cover the detection area. The distributed light source and the diffuser are installed on the side of the monitored area structure or on the floor using a casing (ex.: plastic, aluminum extrusion, etc.) to facilitate the installation and the maintenance (to change a section of illumination for instance), and to protect the components of the source. This casing can also be used as a diffractive component. In that case, the light is diffracted on the holder and the optical sensor receives this diffracted light instead of directly receiving illumination from the sources.

Different colors may be used as architectural elements or as a retroaction means for the users. For example, in a surveillance application, a green light illumination around the monitored area may indicate that there is no entity in the monitored area while a red light illumination may indicate the presence of an entity. A person entering the monitored area may visually understand the status of the monitored area. For example, in a mobile storage unit application, a green light illumination on both sides of an aisle may indicate that there is no entity in the aisle while a red light illumination may indicate the presence of an entity. A person wishing to close an aisle to open another may visually understand the status of occupancy of the aisle.

Other sources may also be used typically at the entrance of the monitored area or aisle to indicate its status. For example, a white source may be distributed throughout the monitored area or aisle and red and green sources may be provided at the entrance of the area or aisle as indicators.

It is possible to generate specific pulses using specific sources (markers such as marker 1100 in figures 11A and 11B) at each end of the distributed light band to indicate the beginning and the end of the band or each segment. This generation of pulses may be useful when calibrating or during a diagnosis for example. Other specific sources (markers) can be added in a segment to indicate the position of the moving storage unit (x % close). The position of the marker in the image (x, y) will change when the aisle is closing.

Other sources may be installed in other areas to increase the height of the detection in the aisle or the height of the detection area or to have a stealth detection area. For example, an IR distributed light source may be installed at the top of a storage unit (or on one edge of a shelf) or all around a fence. This source then becomes a second line of detection for the entity detection system. Several sources can be installed and become multiple lines of detection for the entity detection system.

The optical detector 24 is typically installed just above the distributed light source but, as discussed above, can also be provided near the ceiling, hung from a wall or any object facing the distributed light source. The optical detector is preferably installed in a box and typically a window protects the components (optical and electronic).

Usually, all the cables to supply power and to communicate with the entity detection system come from the structure delimitating the perimeter (for example, the surrounding wall).

Figure 2C:
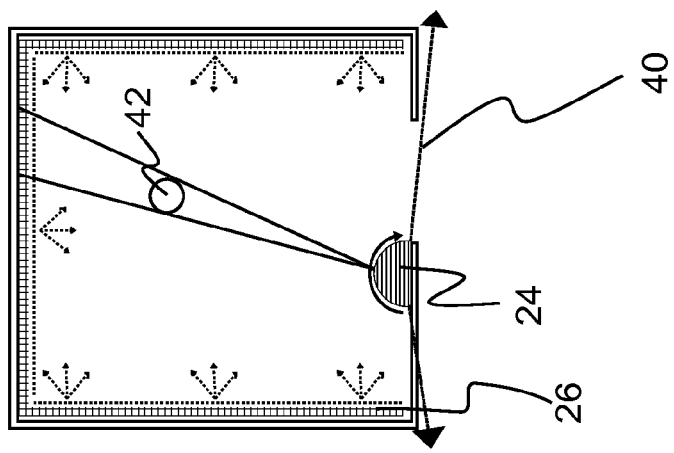
FIG. 2 comprises FIGS. 2A, 2B and 2C which show a top view of a monitored area with different configurations for the lighting system.
Figure 2B:
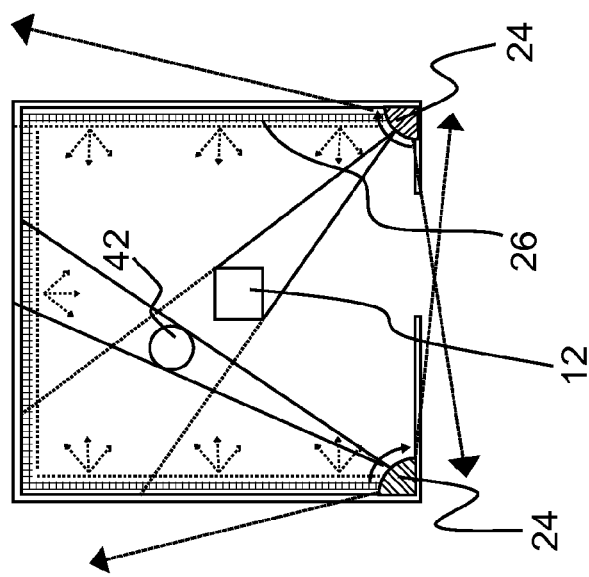
Figure 2A:
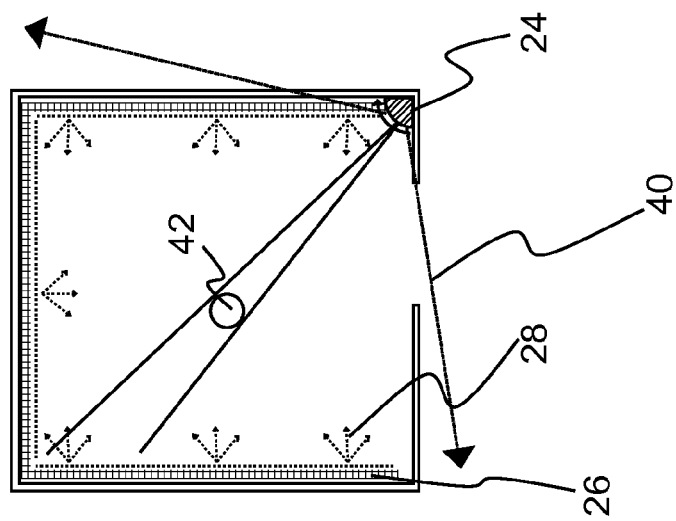

FIG. 2A shows a top view of a monitored area. An optical detector 24 is used to detect light 28 from the distributed light source 26 which surrounds monitored area. This sensor has typically a wide Field Of View 40 (FOV) to see the continuous long strip of illumination,. Normally, this FOV has to be close to 90° to cover the surface of the monitored area and can be up to 360°. When an entity 42 is between the optical detector 24 and the distributed light source 26, an important attenuation in the illumination is detected by the optical detector 24.

FIG. 2B shows an example configuration with two optical detectors 24 and one distributed light source 26 with permanent feature 12. With this configuration, the monitored area does not suffer from a blind spot made by the permanent feature 12 and the system can still detect an entity 42.

FIG. 2C shows a configuration with one optical detector 24 with a very large FOV 40 (more than) 180° covering the whole surface illuminated by the distributed light source 26. It is therefore able to detect an entity 42.

Figure 3:
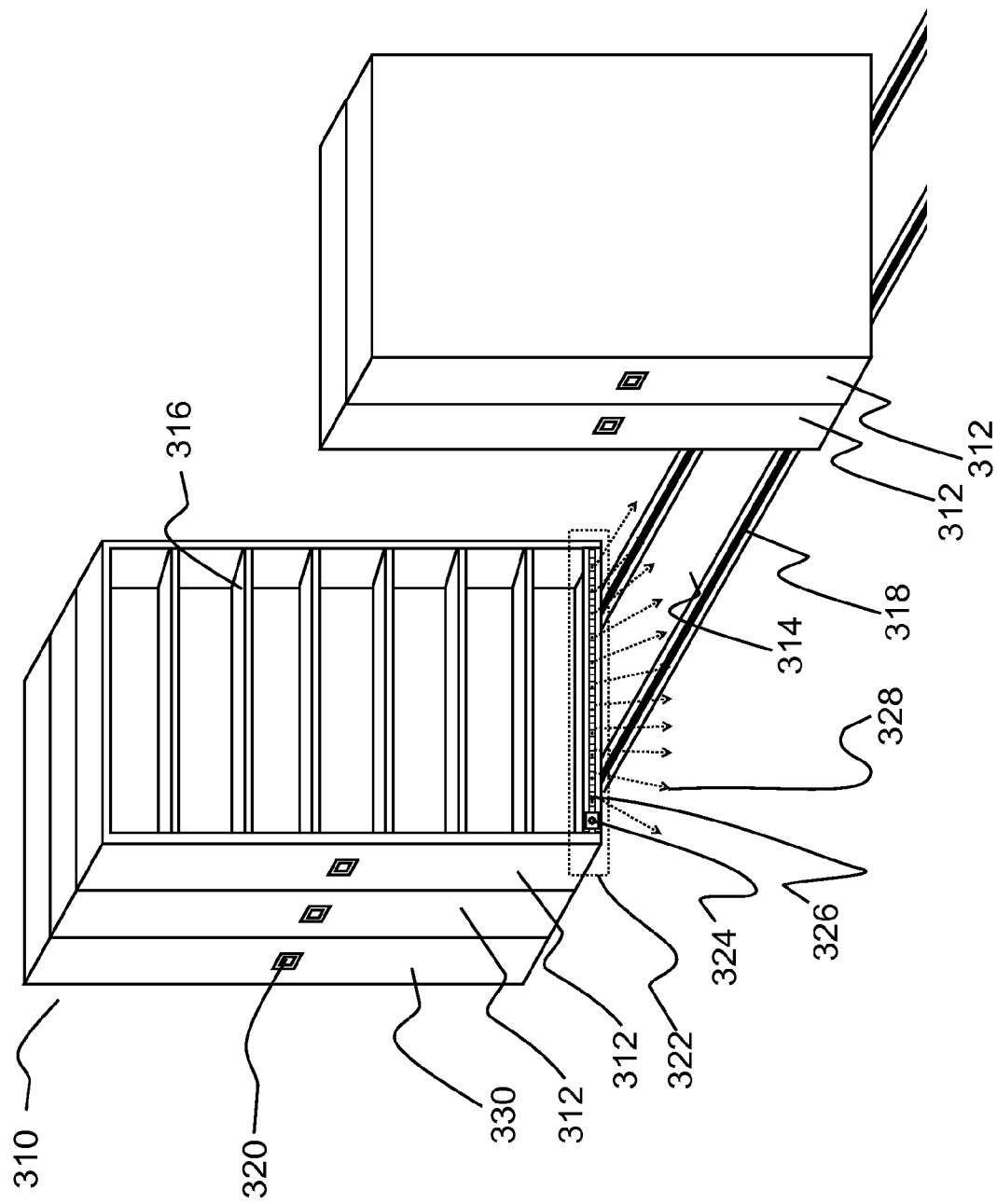
FIG. 3 shows an example embodiment of the entity detection system in a mobile storage system.

FIG. 3 shows an application example for the entity detection system and method. In this example application, the entity detection system is used to detect the presence of an entity in an open aisle of a mobile storage system 310. A mobile storage system 310 having several mobile storage units 312 and one stationary unit 330. A wall (not shown) can also be provided at an end of the system 310. An open aisle 314 permits access to storage space 316 (ex.: shelves). A drive mechanism or arrangement (not shown and typically using an electrical motor) allows the movement of a mobile storage unit 312 on a mounting rail 318 and permits closing an aisle to open another aisle. Control panel 320 (ex.: keypad) is an input to a controller unit (not shown) which can be used by a user to control the movement of a storage unit 312. By closing an aisle, a user can open another aisle and access a specific storage space. Each side of a storage unit 312 has an entity detection system 322 for detecting an entity in an open aisle. The open aisle is therefore the monitored area.

The entity detection system 322 has at least one optical detector 324 and at least one distributed light source 326 illuminating the open aisle 314 with visible or invisible light 328. The optical detector 324 on one side of an open aisle detects the illumination of the distributed light source 326 from the other side of the open aisle, namely from a neighboring or opposing section of the mobile storage system.

The optical detector 324 and the distributed light source 326 are typically installed on a side of the mobile storage unit 312 (typically near the bottom of the structure), or in some cases at the bottom of a wall or of a stationary unit 330. The distributed light source 326 emits visible light (red, green, white, etc) or invisible light (infrared for instance). Typically, the distributed light source 326 is made of a strip of LEDs, a light pipe with optic fiber or other light source able to distribute the illumination on the aisle between two storage units of the mobile storage system or one storage unit and a wall. The distributed light source covers the whole length of the aisle.

In case of emergency, if visible illumination is used, the visible illumination indicates which aisles are open and therefore facilitates evacuation or signaling to the surrounding people.

The optical detector 324 is preferably installed in a box and typically a window protects the components (optical and electronic).

Usually, all the cables to supply power and to communicate with the entity detection system use a dedicated space close to the mounting rails 318 or are installed at the top of the mobile storage system.

Figure 4B:
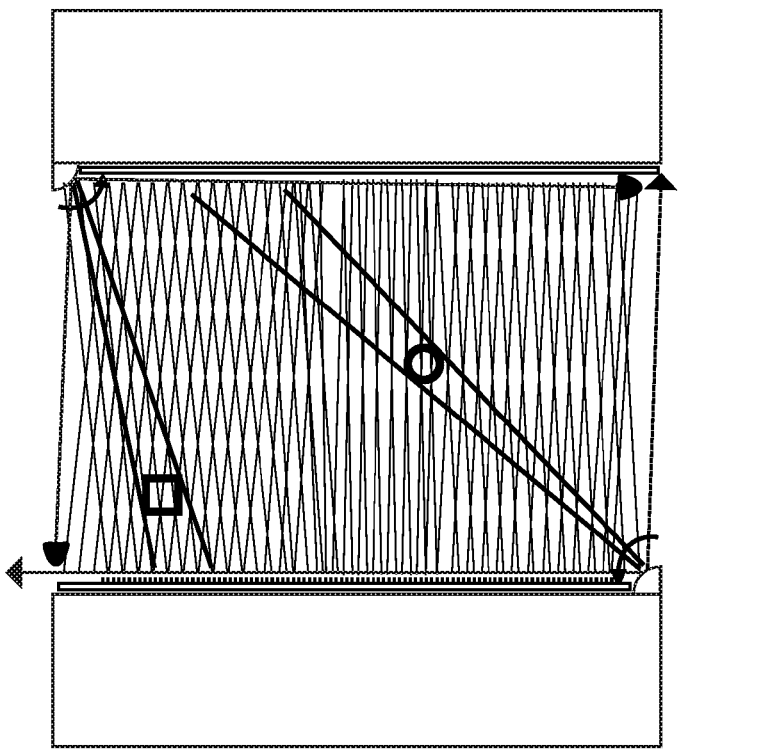
FIG. 4 comprises FIGS. 4A and 4B which show a top view of an aisle with two sections of a mobile storage system integrating the entity detection system, in FIG. 4A, an entity is detected by the first optical detection, in FIG. 4B, an entity is detected by each optical detector.
Figure 4A:
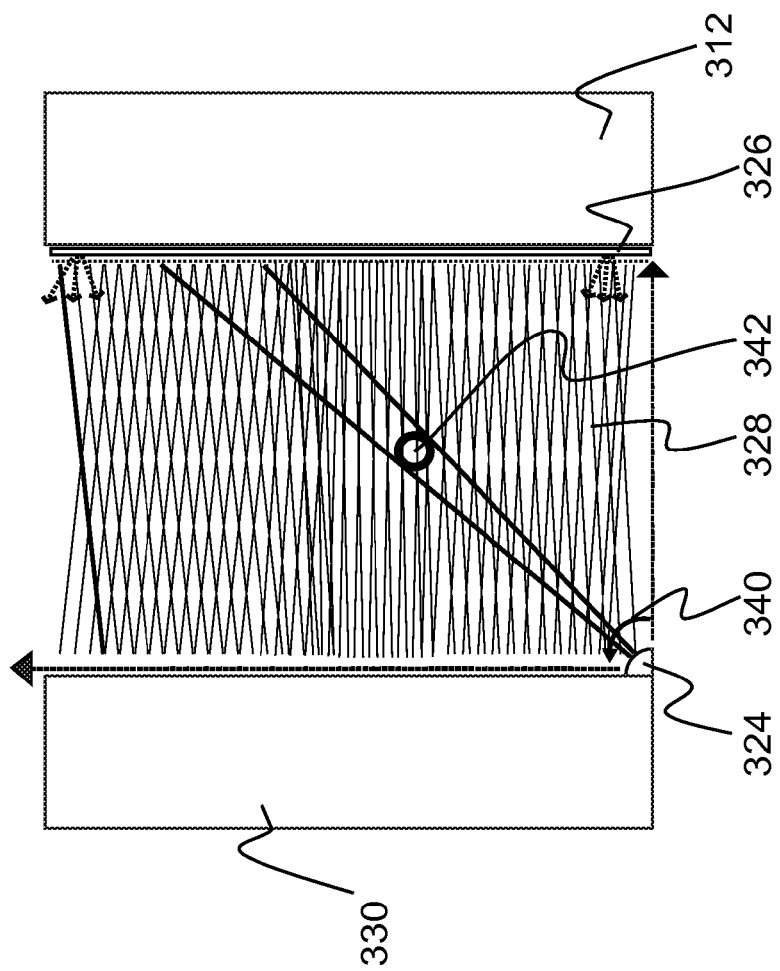

FIG. 4A shows a top view of an open aisle with two sections 312, 330 of a mobile storage system. An optical detector 324 is used to detect light 328 from the distributed light source 326 on the opposite side of the aisle. This sensor has a relatively wide Field Of View 340 (FOV) to see the continuous long strip of illumination, for instance 30 feet, in a narrow aisle (typically, 4 feet or less for commercial application, 10 feet or less for industrial application). Normally, this FOV has to be close to 90° to cover the surface of the open aisle. When an entity 342 is between the optical detector 324 and the distributed light source 326, an important attenuation in the illumination is detected by the optical detector 324.

FIG. 4B shows an example configuration with two optical detectors and two distributed light sources. The optical detector on one side detects the illumination on the other side and covers half of the surface of the open aisle. Typically, when several optical detectors (and distributed light sources) are installed, optical detectors are daisy-chained with one master and slave(s).

Figure 5:
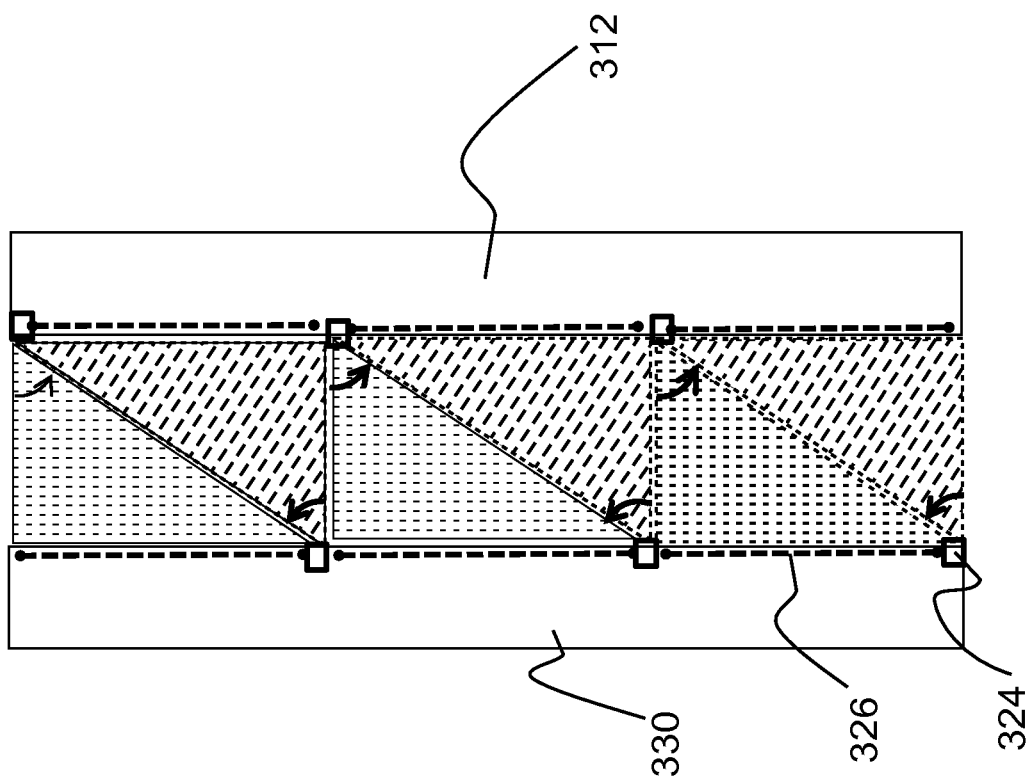
FIG. 5 shows a top view of an aisle with a series of multiple optical detectors provided on each side of the aisle.

FIG. 5 shows a configuration with several optical detectors and distributed light sources for a very long aisle, typically used for industrial application. More precisely, FIG. 5 shows an aisle with a detector system made with six optical detectors and 6 distributed light sources. Each optical sensor acts as part of a network covering the whole surface of the aisle, even if aisle is very long.

Figure 6:
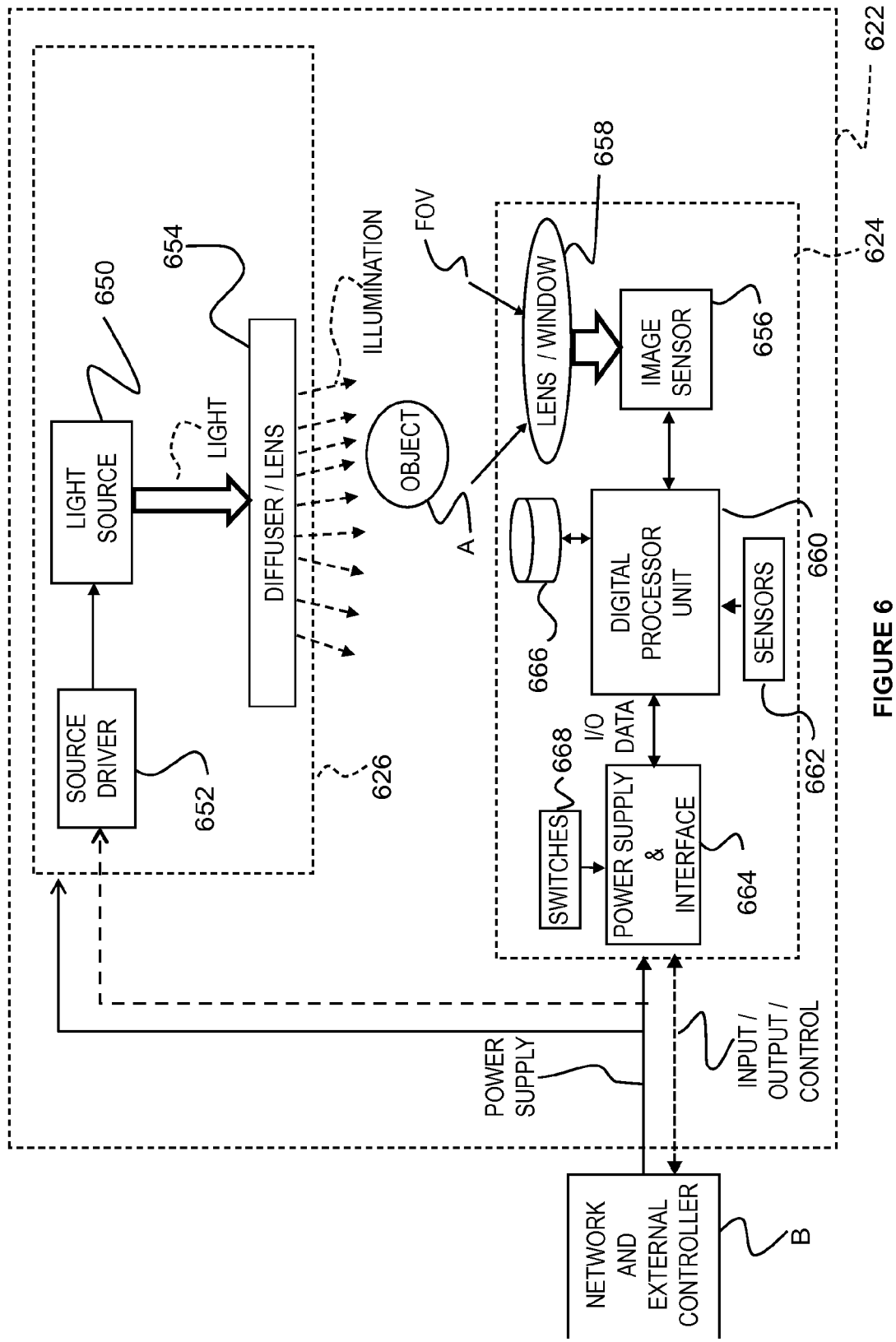
FIG. 6 shows a block diagram illustrating main components of an example embodiment of the entity detection system for monitoring an area.

FIG. 6 presents a block diagram of an example embodiment of the entity detection system 622. The entity detection system 622 has at least one optical detector 624 and at least one distributed light source 626. The distributed light source 626 has at least one light source 650. The light source 650 can have one or more solid-state lighting devices, LEDs for instance (visible or non-visible). The light source 650 illuminates the environment directly or via a diffuser, a lens and/or an optical filter 654. The light source 650 is connected to a source driver 652, so as to be driven into producing continuous illumination or pulsed illumination. In the case of pulsed illumination with visible light, it should be preferable to have a pulse frequency high enough not to be perceivable by the human eye (typically more than 20 Hz). Pulsed illumination can improve the detection performance with a higher peak of illumination during integration of the image sensor and lower continuous power.

The source driver 652 can adjust the level of illumination. The optical detector 624 may be adapted to obtain information on the ambient light to optimize the adjustment. An ambient light sensor (not shown) can also be used.

The source driver 652 can also measure the current and the voltage of the light source for monitoring and diagnosis purposes and eventually for sharing this information with the digital processor unit. The source driver 652 can be controlled by the Digital Processor Unit 660 or Network and external controller B.

The illumination can be turned off when the detection function is not used in the monitored area or when the aisle is completely closed in the mobile storage unit example. Visible illumination can also be controlled to emit low frequency pulses to inform users of different status. For instance, light pulse at low frequency (ex.: 1 pulse/sec) may indicate an alarm.

The optical detector 624 has an image sensor 656 which has the function to detect the illumination light from the distributed light source 626. The image sensor 656 is for example any CMOS or CCD array sensor, color or monochrome. The image sensor 656 has a lens/window 658 collecting light emitted by the distributed light source 626 with a generally a wide FOV, typically between close to 90° and 360°, covering the surface of the monitored area. The surface of the monitored area can be the length of the aisle in the mobile storage unit example.

A window is useful to protect the image sensor, the lens and the electronic components. A casing is typically provided to protect the components. When the entity detection system is turned off, the optical detector 624 can be put on a hold mode. The optical detector 624 can be a camera, a smart camera or a camera with a processing unit adapted to carry out some processing of the images.

Optical filters (not shown) can be provided with the image sensor 656 to attenuate ambient background light emitted from others sources of light thereby enhancing the performance of the detection as a function of the color of the illumination. Digitalization of image information is made by the image sensor 656 and is transferred to a digital processor unit 660.

Digital processor unit 660 is connected to the source driver 652 and to the image sensor 656, and controls parameters such as the optical power of light pulses, the frequency of pulses, synchronization with the image sensor 656, synchronization from other optical sensors and/or distributed light source, the integration time, the sample rate, etc. When the light is pulsed, the digital processor can integrate an image during the illumination and another image without illumination to be immune from the background light.

The digital processor unit 660 has a processing unit (e.g., CPU, DSP, microcontroller) so as to interpret the data from the image sensor 656.

Accordingly, information about the presence of an entity in the monitored area is determined by the digital processor unit 660 as a function of the relation between the detected light data from the distributed light source in the field of view and an important fluctuation of the illumination from a detected entity A.

The digital processor unit 660 also performs the calibration process. Image analysis permits to determine the section of the distributed light source representing the beginning and the end of the monitored area.

Diagnosis of the distributed light source 626 can be performed by the digital processor unit 660. The intensity of the illumination and the quality of the line are stored in database memory 666. Each time a command to start the diagnostic procedure is needed, the image sensor detects the distributed light source and the digital processor unit evaluates the intensity and the continuity of the line, detecting if any part of the distributed light source has failed or if any permanent feature is present in the FOV. The presence of permanent features can be confirmed by the user of the entity detection system or can be double-checked by using more than one optical detector to obtain more than one perspective. If a small part of the illumination is broken, compensation can be determined. Results of the diagnosis can be sent to the network.

In the example of a mobile storage unit, each time an aisle is opened and before any detection of an entity entering the aisle, the image sensor detects the distributed light source and the digital processor unit evaluates the intensity and the continuity of the line, detecting if any part of the distributed light source has failed.

A specific diagnosis source (not shown), for instance a small IR LED, can be integrated in the optical detector 624 to determine the state of the window of the optical sensor module. During calibration, the level of reflection from the sensor window can be measured and stored in the database memory. During operation, the system can measure the reflection of the window using this specific diagnosis source and compare it with the calibration data stored in the database memory. A high level of reflection can mean that the window is dirty and may have an impact on the operation of the system. Diagnosis of the window can be sent to the external controller.

The optical detector 624 has sensors 662 connected to the digital processor unit 660. Sensors 662 can include temperature sensors, accelerometers, inclinometers, smoke sensors and humidity sensors, for example. For instance, an accelerometer can be helpful in detecting the movement of the storage unit (opening or closing). Those sensors 662 are useful during installation and operation. Optional optical sources (not shown) like infrared or color LED for example, can be integrated in the optical detector for detection and status purposes. Optional detector sources may be used as an indicator for the position of the optical detector or for indicating the status of the section covered by the optical detector (presence or absence of an entity). Optional optical sources can be seen and detected by other optical detector placed elsewhere in the monitored area. Optional detector sources can be placed at the end of the storage unit. Optional optical sources can be seen and detected by the optical detector on the other side of the aisle.

The optical detector 624 has a power supply and interface 664. The interface section is connected to digital processor unit 660 and communicates with the network and the external controller B (RS-485, wireless, power line, Ethernet, PoE, CAN bus, relay contact, wireless link, etc.). Direct communication between the optical detectors is also possible. Information is related to the detection of an entity in the monitored area and to other types of measurement (temperature, etc.). The network and the external controller can also program, calibrate, send information about the monitored area (permanent features, activation or deactivation of the security of the monitored area, etc) and control the entity detection system 622. The network and the external controller can send information about the movement of the storage unit. Parameters like thresholds, intensity of illumination, etc, can be sent and stored in the database memory 666. The interface also controls the activation (On/Off) and synchronization of the source driver 652. Switches 668 can be used to reset the entity detection system, start a calibration sequence and/or to determine an address on a unit.

During installation, the interface can be used to receive an image from the optical detector to confirm that the FOV of the image sensor covers all the illumination of the monitored area. During operation, images from the optical detector can be sent to the external controller for security purpose. For instance, if the entity detection system detects an entity, it can send an image of the situation of the monitored area. Then, further actions can be done by the external controller based on that information.

When a monitored area is wide and long, several systems can be installed to cover the space for the detection purpose. Several optical sensors and distributed light sources can be connected in a network.

Figure 7:
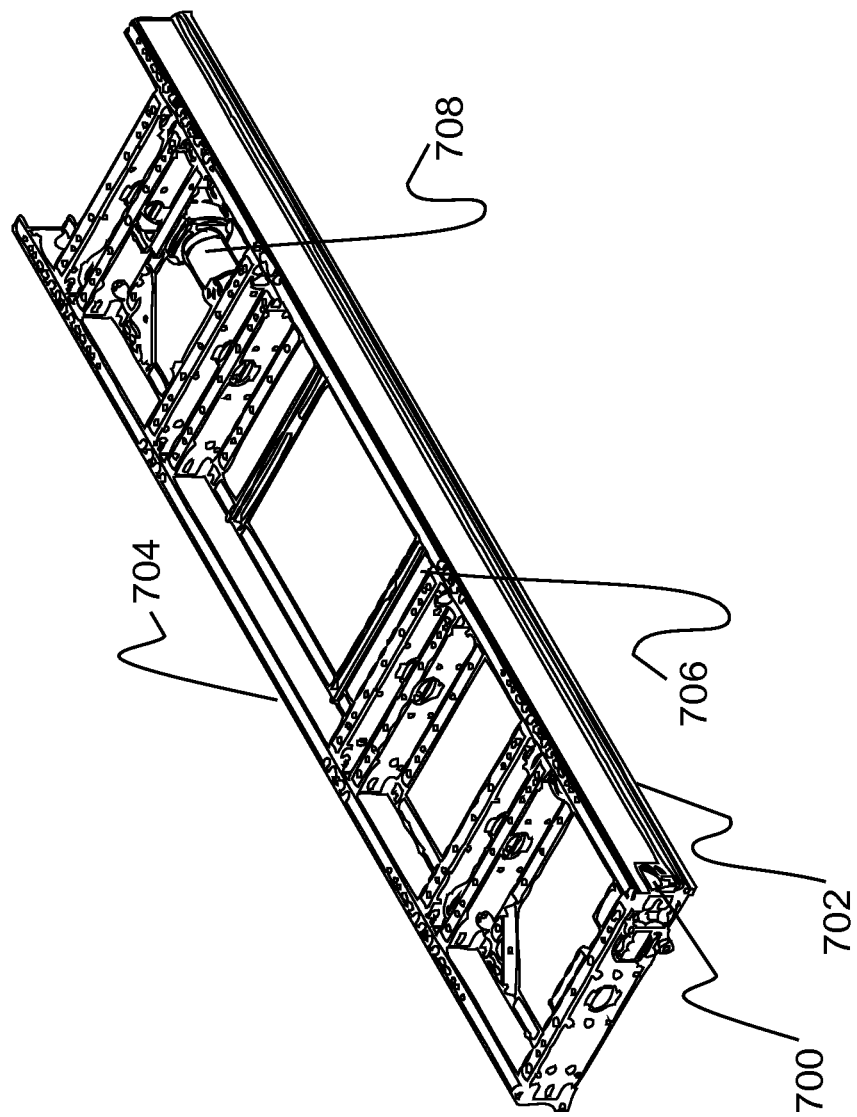
FIG. 7 shows the basic motorized structure of an example mobile storage system equipped with an example entity detection system.

FIG. 7 shows the basic motorized structure of an example mobile storage system equipped with an example entity detection system. In this particular view of an example basic motorized structure 704 of an example mobile storage system, the shelving of the unit is omitted for clarity. Shelving support members 706 are shown. The illuminated band 702 extends continuously along the longitudinal axis of the detection side of the mobile storage unit. The optical detector 700 is provided at one end of the mobile storage unit, just above the illuminated band 702. The optical detector 700 is provided in a casing with a window facing the illuminated band of the neighboring mobile storage unit.

The mobile storage unit is movable between a closed position wherein the detection sides of the mobile storage unit and the opposing unit are juxtaposed and no aisle is created and an open position wherein the mobile storage unit and the opposing unit are spaced-apart and a longitudinally extending aisle is defined therebetween, the longitudinally extending aisle being the area. The opposing unit can be a wall, a second mobile storage unit or a stationary storage unit.

A drive arrangement 708 for movement of the mobile storage unit, along a path, one of toward and away from the opposing unit, to open and close the aisle is shown. As will be readily understood, a controller for the drive arrangement controlling the movement of the mobile storage unit is not shown. Similarly, a user input switch for the controller for activating the drive arrangement for movement of the mobile storage unit is only shown in FIG. 3 (control panel 320). The alarm generator for generating an alarm if the image analyzer determines the status of the area to be presence of an entity is not shown but the controller would block movement of the mobile storage unit upon the alarm using the drive arrangement 708.

Others embodiments are possible. FIG. 8 comprises FIG. 8A and FIG. 8B (photograph) which shows an example embodiment using a retroreflector and a photograph of the captured image of the retroreflective band. In FIG. 8A, the distributed light source is replaced by a retroreflector 800 and a punctual source with a large field of illumination is installed close to the optical detector 802 and emits light in direction of the retroreflector. The retroreflector reflects light back to its source with a minimum scattering of light. This light reflected back is detected by the optical detector with the same effect than a distributed light. FIG. 8B shows the light reflected back from a retroreflector as seen by the optical detector.

Figure 9:
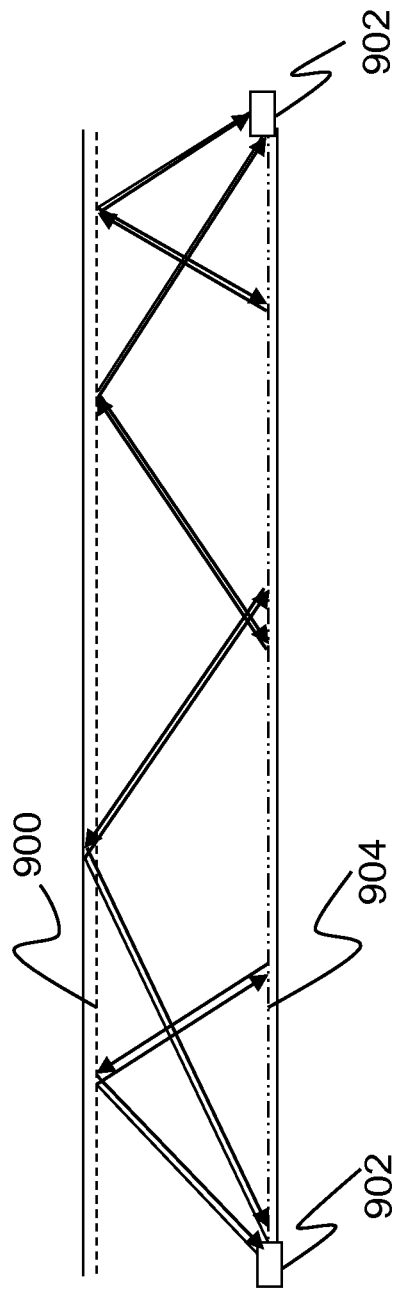
FIG. 9 is an example embodiment using a retroreflector and a mirror film.

FIG. 9 is an example embodiment using a retroreflector and a mirror film. FIG. 9 shows a retroreflector strip 904 installed on one side of the aisle with an optical sensor 902 at each end including a punctual source. A mirror, typically a mirror film 900, is installed on the other side. In that embodiment, the light from the punctual source is reflected on the mirror through the retroreflector. Then, the retroreflector reflects light back to the mirror and the mirror reflects this light back to the optical detector.

Other sources like a laser, for example a laser emitting a line, can be used to illuminate the aisle and be detected by the optical detector.

Figure 10:
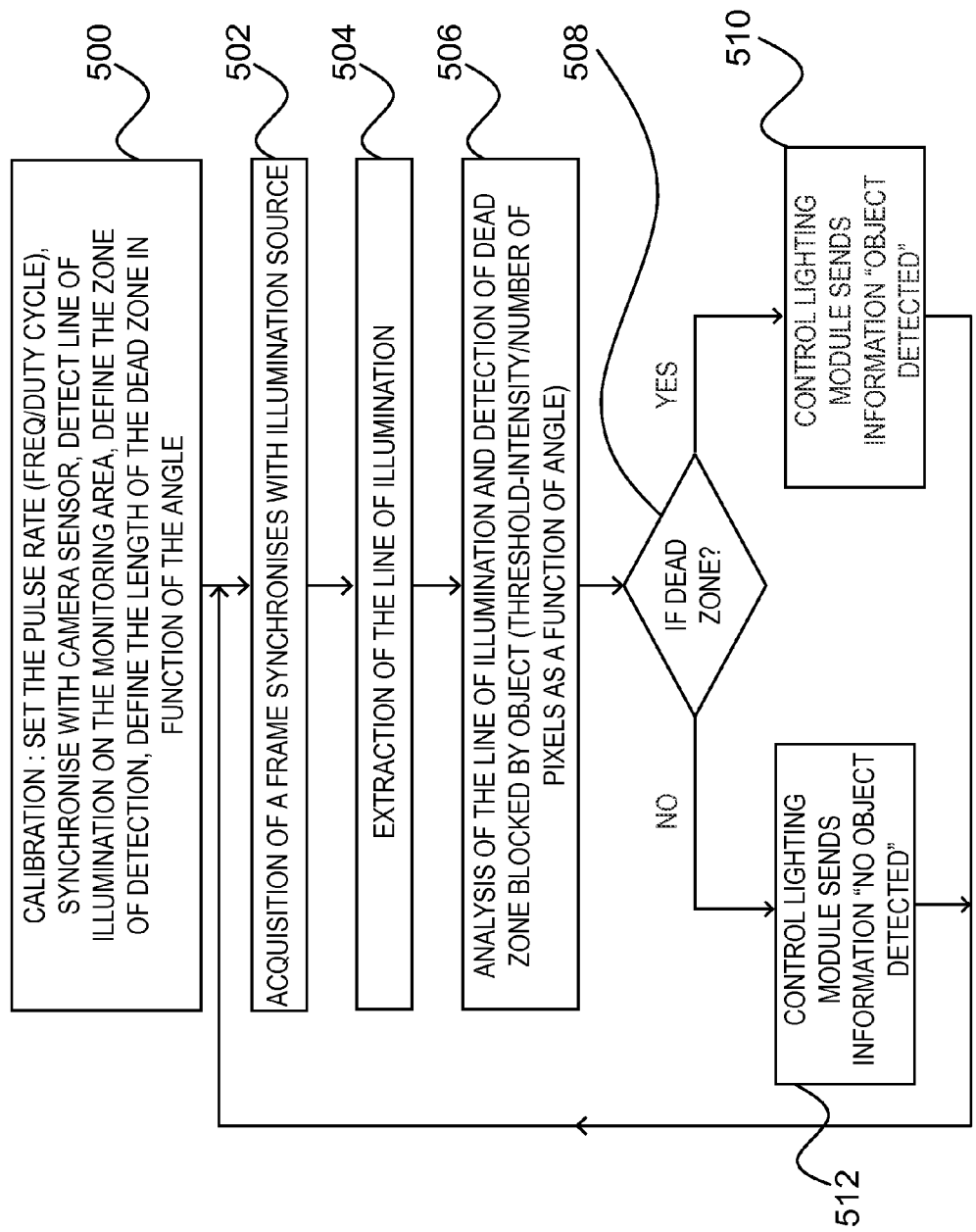
FIG. 10 is a flow chart of main steps of an example embodiment of the detection method.

FIG. 10 is a flow chart of main steps of an example embodiment of the detection method. It details typical operation of the entity detection system. Calibration 500 sets all the parameters for the operation. This step is triggered by the network and the central controller or by a switch initiating the calibration. During calibration, the monitored area must be clear without any movable entity present inside of the monitored area (only permanent features may be present). In the case of a mobile storage unit, the aisle must be open without any entity inside. The calibration 500 activates the distributed light source of the monitored area and takes images with the optical sensor on the area. Calibration with several distributed light sources and several optical detectors covering the entire area can be done at the same time. During the calibration 500, the optical detector has to search and find a line of illumination and determine the region of interest for detection purposes. The detected line can be continuous or made by separate dots of illumination in accordance with the distributed light source (space between dots must be inferior to the dimension of a detected entity). Depending on optical components, the line detected by the image sensor can be curved. The position of the line of illumination is stored in the database memory. Depending on the type of the surface, reflection on the floor can be detected by the optical sensor. FIG. 5A shows a typical image of the illumination with reflection on the floor. This reflection can be rejected by the analysis of the image (reflection is positioned lower than the line of illumination and is typically lower in intensity). The line of illumination represents the entire surface of the area and the optical detector has been installed to cover the entire surface of the illumination. If the illumination is pulsed, the image sensor can be synchronized with the illumination. The sensitivity of the image sensor can be set at that stage.

At acquisition 502, the image sensor acquires at least an image (synchronize if needed with pulsed light) and transfers it to the processor. At extraction 504, the processor extracts the line of illumination and compares it with the information from the calibration data and thresholds. At analysis 506, the processor analyses the line of illumination and when it finds a region wider than X (or f(x)) with a level of intensity lower than Y (or f(y)), then an entity is detected. If not, the processor considers that there is no entity detected. The processor can control the lighting using the detection result (it can, for example, change the illumination color, generate an alarm, etc.). Information about the presence or the absence of an entity can be sent to the external controller by the network. X is a parameter varying in function of the angle of the FOV.

In the embodiment where specific pulses using specific sources are generated for use as markers (such as marker 1100 in figures 11A and 11B) at each end of the distributed light band to indicate the beginning and the end of the band or segments of the band, the entity detected method consequently further comprises providing at least one marker on said illuminated band, said marker indicating an end of said illuminated band; storing a marker image profile; analyzing said image to detect a marking pulse in said continuous illuminated band apparent on said image, comparing said marking pulse to said marker image profile to confirm that said marking pulse is an image of said marker; and determining a location of an end of said continuous illuminated band on said image when said marking pulse is said image if said marker.

FIG. 11 comprises FIGS. 11A (photograph) and 11B (photograph) which show photographs of example images captured by the optical detectors, in FIG. 11A, there is no entity present, in FIG. 11B, three entities are present. In FIG. 11B, the entities cause discontinuities in the line of illumination. A first entity at the left hand side of the image causes one discontinuity and an entity, namely a person, at the right hand side of the monitored area causes two discontinuities (his legs). The size of the discontinuity is dependant on the size of the entity and also dependant on the position in the FOV. In that case, the entity on the left hand side is closer to the optical detector and will cause a wider discontinuity when compared to a discontinuity located further from the optical detector at the end of the monitored area.

FIG. 12 (photograph) is a photograph of an example image where the whole illuminated band is apparent and the non-illuminated environment of the band, on both sides, is also apparent. In FIG. 12, the example distributed light source is installed to cover a surface delimited by two walls (at a corner of these two walls). The system is able to determine the beginning and the end of the distributed light source based on the clear level of illumination in comparison to ambient light level. The entity detection system determines a region of interest and stores the shape, the length, the height and the typical intensity of the distributed light source when it illuminates. Those parameters are dependant on the position in the Field Of View (relationship between the FOV and the distance between the distributed light source and the optical detector). The intensity Y is related to the intensity of the illumination (Y may also vary depending of the angle and the distance).

FIG. 13 (photograph) is a photograph of an example image where the illuminated band is created by a series of punctual sources, namely a strip of LEDs. When using punctual sources (like LEDs) and particularly when the aisle is closing (or opening), the distribution of the line of illumination is a sequence of bright spots separated by a distance (in terms of pixels) that increases (decreases if opening) when the distributed light source is approaching (or moving away If opening) the optical detector. The parameter X (or f(x)) can be adapted to that situation to be able to detect an entity when the aisle is closing (opening) without generating any false alarm.

Once an entity is detected, the processor can track and classify this entity. For instance, an entity can be classified as an entering entity. This can be done by detecting the position of the entity at time TO, storing its position, and detecting the entity at time T1, and determining the displacement of this entity. For instance, an entity entering in the monitored area will cause a fluctuation on the line of illumination detected by the optical detector in a specific section on the FOV. When this entity moves further into the monitored area, the position of the entity changes in the FOV. For a configuration with several optical detectors, the entity can move up to the point where this entity can enter in the FOV of the second optical detector installed on other section of the monitored area. This entity can leave the monitored area at another end and the optical detector at this other section will detect this leaving entity or, this entity can go back and leave the monitored area by the same end and will be detected again by the optical detector at that end. The signature and behavior of an object versus a person are different and can be used as information for improving the security of the system. The number of entering entities can be used for counting the number of times presence of an entity is detected in the monitored area (ex.: statistic purposes, continuous presence detection, etc). Each entity can be tracked and detected until the entity leaves the monitored area (exiting).

For instance, an entity entering in one side of the aisle is clearly detected by the optical detector installed in that side. When this entity moves further into the aisle, the position of the entity changes in the FOV of the optical detector up to the point where this entity can enter in the FOV of the second optical detector installed on the other end of the aisle. This entity can leave the aisle at the other end and the optical detector at this other end will detect this leaving entity or, this entity can go back and leave the aisle by the same end and will be detected again by the optical detector at that end.

The tracking of an entity can also be useful to detect an entity standing in the middle of the monitored area and climbing up the wall or other structure in the monitored area. In that case, the entity still can be in the monitored area and the system will continue to report that someone is in the area even if the line of illumination is not disrupted. In that case, sending image information from the optical detector to the external controller can be useful particularly for security purpose.

For instance, three areas can be set, two on both sides of the aisle and one covering the middle of the aisle. The tracking process can determine the position of the entity and the system evaluates an entity is leaving the aisle or climbing in the middle of the aisle.

Adding other(s) distributed light source(s) at a higher level in the monitored area is another way to detect an entity, for example a person, climbing in the area or to help covering the detection of an entity at a higher level. The camera has a vertical field of view permitting the detection of a distributed light source at a several feet of height. Vertical distributed light sources can also be installed at the ends of the monitored area to cover entry/exit, a door for instance. For those distributed light sources, visible or infrared illumination can be used. The entity detection system can also be installed higher to see a top view of the surface and the distributed light source.

The entity detection system can receive information from the external controller, such as information about permanent features and activation or deactivation of the monitored area. An important aspect of the entity detection system is the detection of an entering entity in the monitored area when a security activation has commenced. An example of such an application would be when the entity detection system is used in an elevator and triggers the door controller to activate the door. The entity detection system could immediately send information to the external door controller about the detection of the presence of an entity to stop or begin movement of the elevator door.

The entity detection system can receive information from the external controller. For instance, information about the opening and closing of an aisle can be received and used by the detection unit. When the aisle is closing, the optical sensor will detect an increasing length of illumination. An important aspect when closing an aisle is the detection of an entering entity. The entity detection system must immediately send this information to the external controller to stop the movement of the storage unit.

When an aisle is opening, the entity detection system can perform an auto diagnosis particularly on the quality of the line of illumination, on the position of the region of interest and on several parameters, until an entity enters in the aisle. The results of the diagnosis can be sent to the external controller.

A reset of the entity detection system may be triggered manually from the optical detector (switch) or by external controller when in doubt that there may be an entity in a monitored area while the entity detection system reports otherwise. In some cases, it may be useful to reset the system. For example, if the system has detected an entity and lost the detection in the middle in the area, the entity detection system may consider that this entity is still in the area even if the entity is no longer present. In that case, a user can perform a manual reset by using a switch on the optical detector or by the panel control. The system will restart and may diagnostic itself before entering in its normal operation mode.

The entity detection system has several mobile storage, industrial, commercial and security applications. In an industrial area protection, the entity detection system can clearly define a protected area using the distributed light. It acts like a light curtain and detects any entity which drops on this area or any entity coming into the area when it is not permitted or when it is dangerous. It is also useful to determine a safety area when the use of a robot or other moving machine can potentially cause harm to an entity in a specific area.

Elevator door protection is another application where the entity detection system can improve the safety of passengers by sending a feedback using different colors of illumination. In that case, the distributed light source is installed around the door structure and can be seen by the user. An optical detector detects the presence of the passenger in the aperture and sends this information to the elevator door controller. When the door controller wants to close the door, it changes the color of the distributed light source to warn the user before starting to close the door. The controller will close the door only if no entity is detected in the aperture.

In the application of security intrusion detection covering a large area, the distributed light can be installed on the wall or on the fence delimiting the perimeter of the monitored area. At least one optical detector is installed and detects any entity in the monitored area. This information is sent to the external controller (alarm, image, etc). Users can configure different sections to determine safety area versus areas where activities are permitted.

The entity detection system can be installed on existing mobile storage systems or provided during installation.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

The embodiments described above are intended to be exemplary only. The scope of the invention is therefore intended to be limited solely by the appended claims.

We claim:

1. An entity detection system for monitoring an area, said area created between a mobile unit and an opposing unit, said mobile unit extending along a longitudinal axis and having a detection side, said opposite unit extending parallel to the longitudinal axis and having a detection side facing the detection side of the mobile unit, the mobile unit being movable between an open positon wherein the mobile unit and the opposing unit are spaced-apart and a longitudinally extending aisle is defined therebetween and a closed position wherein the detection sides of the mobile unit and the opposing unit are juxtaposed and said aisle collapses, said longitudinally extending aisle being said area, said entity detection system comprising:
a distributed light source adapted to provide an illuminated band, said illuminated band extending longitudinally continuously along the longitudinal axis of a first one of said detection side of said mobile unit and said detection side of said opposing unit;
at least one marker provided on a terminal minor portion of said illuminated band, a major portion of said illuminated band disposed adjacent to the minor portion and not having said at least one marker, said at least one marker generating a marking pulse using a specific source indicating an end of said illuminated band, wherein the marking pulse is indicative of a position of the mobile unit;
an optical detector, said optical detector being provided at a second one of said detection side of said mobile unit and said detection side of said opposing unit, said second one being different than said first one, said optical detector having an image sensor adapted to capture an image, the illuminated band and said at least one marker being viewable by the image sensor and being capturable in said image, a space between said distributed light source and said image sensor being part of said area;
a memory for storing a detection threshold and a marker image profile, wherein said detection threshold includes an intensity amplitude threshold and a length threshold; and
a processor receiving said image from said image sensor, said processor having an image analyzer for analyzing said image to detect a discontinuity and the marking pulse in said continuous illuminated band apparent on said image and to determine an intensity amplitude and a length of said discontinuity, said discontinuity being caused by a presence of an entity in said area, between said distributed light source and said image sensor, said entity blocking light emitted from said illuminated band toward said image sensor, said processor capable of comparing said marking pulse to said marker image profile to confirm that said marking pulse is an image of said marker and of determining a location of an end of said continuous illuminated band on said image, said location of said end of said continuous illuminated band on said image being dependent upon said position of said mobile unit with respect to said opposing unit;
said processor further comprising a discontinuity comparator for comparing said intensity amplitude of said detected discontinuity to said intensity amplitude threshold and said length of said discontinuity to said length threshold, said intensity amplitude threshold and said length threshold being a function of said position of said mobile unit with respect to said opposing unit and for determining a status of said area to be a presence of an entity if said length of said discontinuity is longer than said length threshold and said intensity amplitude of said discontinuity is smaller than said intensity amplitude threshold; and
said processor also comprising a status indicator for indicating said status of said area to be one of said presence of said entity and an absence of said entity based on said comparing said intensity amplitude and said length and on said location of said end of said continuous illuminated band.

2. The entity detection system as claimed in claim 1, wherein the illuminated band is entirely viewable by the optical detector.

3. The entity detection system of claim 1, further comprising a plurality of illuminated bands extending continuously along all extremities of said area.

4. The entity detection system of claim 1, further comprising a plurality of optical detectors.

5. The entity detection system of claim 1, further comprising an alarm generator for generating an alarm if said status indicator indicates said status of said area to be presence of an entity.

6. The entity detection system of claim 5, further comprising a visual indicator for indicating said status of said area based on said alarm.

7. The entity detection system of claim 1, wherein said illuminated band emits at least one of visible light and invisible light.

8. The entity detection system as claimed in claim 6, wherein said visual indicator is a color of visible light illumination of said illuminated band.

9. The entity detection system of claim 1, wherein said mobile unit is a mobile storage unit of a mobile storage.

10. The entity detection system as claimed in claim 9, wherein said opposing unit is one of a wall, a second mobile storage unit and a stationary storage unit.

11. The entity detection system of claim 1, further comprising a second optical detector and a second illuminated band, said detection side of said mobile unit and said detection side of said opposing unit each having said illuminated band extending continuously along the longitudinal axis, said detection side of said mobile unit and said detection side of said opposing unit each having said optical detector.

12. The entity detection system as claimed in claim 11, wherein
said processor receives two images, one image from each said optical detector;
said image analyzer analyzes, said discontinuity comparator compares and said status indicator indicates for each image of said two images;
wherein said processor further comprises a status determiner for determining a status of said aisle to be occupied if at least one of said status indicated by said status indicator is said presence of an entity and for determining a status of said aisle to be empty if both of said status indicated by said status indicator is said absence of an entity.

13. The entity detection system of claim 1, further comprising a drive arrangement for movement of the mobile unit, along a path, one of toward and away from the opposing unit, to open and close the aisle, a controller for the drive arrangement controlling the movement of the mobile unit, a user input switch for the controller for activating the drive arrangement for movement of the mobile unit, said detection unit further comprising an alarm generator for generating an alarm if said image analyzer determines said status of said area to be presence of an entity, the controller blocking movement of the mobile unit upon said alarm.

14. An entity detection method for monitoring an area, said area created between a mobile unit and an opposing unit, said mobile unit extending along a longitudinal axis and having a detection side, said opposite unit extending parallel to the longitudinal axis and having a detection side facing the detection side of the mobile unit, the mobile unit being movable between an open positon wherein the mobile unit and the opposing unit are spaced-apart and a longitudinally extending aisle is defined therebetween and a closed position wherein the detection sides of the mobile unit and the opposing unit are juxtaposed and said aisle collapses, said longitudinally extending aisle being said area, said entity detection method comprising:
  providing a distributed light source adapted to generate an illuminated band, said illuminated band extending longitudinally continuously along the longitudinal axis of a first one of said detection side of said mobile unit and said detection side of said opposing unit;
  providing at least one marker provided on a terminal minor portion of said illuminated band, a major portion of said illuminated band disposed adjacent to the minor portion and not having said at least one marker, said at least one marker generating a marking pulse using a specific source indicating an end of said illuminated band, wherein the marking pulse is indicative of a position of the mobile unit;
  providing an optical detector, said optical detector being provided at a second one of said detection side of said mobile unit and said detection side of said opposing unit, said second one being different than said first one, said optical detector having an image sensor adapted to capture an image, the illuminated band and said at least one marker being viewable by the image sensor and being capturable in said image, a space between said distributed light source and said image sensor being part of said area;
  storing a detection threshold and a marker image profile, wherein said detection threshold includes an intensity amplitude threshold and a length threshold;
  analyzing said image to detect a discontinuity in said continuous illuminated band apparent on said image and to determine an intensity amplitude and a length of said discontinuity, said discontinuity being caused by a presence of an entity in said area, between said distributed light source and said image sensor, said entity blocking light emitted from said illuminated band toward said image sensor;
  analyzing said image to detect the marking pulse in said continuous illuminated band apparent on said image;
  comparing said detected discontinuity to said detection threshold by comparing said intensity amplitude of said detected discontinuity to said intensity amplitude threshold and said length of said discontinuity to said length threshold, said intensity amplitude threshold and said length threshold being a function of said position of said mobile unit with respect to said opposing unit;
  comparing said marking pulse to said marker image profile to confirm that said marking pulse is an image of said marker;
  determining a location of an end of said continuous illuminated band on said image, said location of said end of said continuous illuminated band on said image being dependent upon said position of said mobile unit with respect to said opposing unit;
  determining a status of said area to be a presence of an entity if said length of said discontinuity is longer than said length threshold and said intensity amplitude of said discontinuity is smaller than said intensity amplitude threshold; and
  indicating said status of said area to be one of said presence of said entity and an absence of said entity based on said comparing said intensity amplitude and said length and on said location of said end of said continuous illuminated band.

15. The entity detection method as claimed in claim 14 wherein a plurality of discontinuity are detected in said analyzing step.

16. The entity detection method of claim 14, wherein said mobile unit is a mobile storage unit of a mobile storage.

17. The entity detection method as claimed in claim 14, wherein
  said storing said image comprises storing said two images, one image from each said optical detector;
  said analyzing, comparing and indicating comprise analyzing, comparing and indicating for each image of said two images;
  further comprising determining a status of said aisle to be occupied if at least one of said status is said presence of an entity and for determining a status of said aisle to be empty if both of said status is said absence of an entity.

18. The entity detection system of claim 1, wherein the illuminated band is a retro-reflective band, the system further comprising a punctual light source emitting light toward the retro-reflective band.

* * * * *